US 8,589,217 B2

(12) United States Patent
Agarwal

(10) Patent No.: US 8,589,217 B2
(45) Date of Patent: Nov. 19, 2013

(54) ADVERTISEMENT TUNES AND MESSAGES

(71) Applicant: Ankit Agarwal, London (GB)

(72) Inventor: Ankit Agarwal, London (GB)

(*) Notice: Subject to any disclaimer, the term of this patent is extended or adjusted under 35 U.S.C. 154(b) by 0 days.

(21) Appl. No.: 13/910,117

(22) Filed: Jun. 5, 2013

(65) Prior Publication Data
US 2013/0268368 A1    Oct. 10, 2013

Related U.S. Application Data

(63) Continuation of application No. 11/985,955, filed on Nov. 19, 2007, now Pat. No. 8,484,074.

(51) Int. Cl.
*G06Q 30/00*    (2012.01)
(52) U.S. Cl.
USPC .......................................................... 705/14
(58) Field of Classification Search
USPC ......... 705/14, 14.63, 15; 379/201.01, 207.13, 379/67.1, 142.01; 455/414.3, 456.3; 428/466
See application file for complete search history.

(56) References Cited

U.S. PATENT DOCUMENTS

| | | | | |
|---|---|---|---|---|
| 4,811,382 A | * | 3/1989 | Sleevi | 379/67.1 |
| 6,889,054 B2 | * | 5/2005 | Himmel et al. | 455/456.3 |
| 7,187,761 B2 | * | 3/2007 | Bookstaff | 379/201.01 |
| 7,831,473 B2 | * | 11/2010 | Myers et al. | 705/14.64 |
| 7,887,929 B2 | * | 2/2011 | Strock et al. | 428/633 |
| 2003/0050837 A1 | * | 3/2003 | Kim | 705/14 |
| 2007/0005424 A1 | * | 1/2007 | Arauz | 705/14 |
| 2007/0005434 A1 | * | 1/2007 | Roth et al. | 705/15 |
| 2007/0189474 A1 | * | 8/2007 | Cai | 379/142.01 |
| 2008/0045195 A1 | * | 2/2008 | Cortegiano | 455/414.3 |
| 2008/0212758 A1 | * | 9/2008 | Baiz Matuk | 379/207.13 |

* cited by examiner

*Primary Examiner* — Samica L Norman
(74) *Attorney, Agent, or Firm* — Ash Tankha; Lipton Weinberger & Husick

(57) ABSTRACT

Disclosed herein is a method and system for generating revenue and sharing the generated revenue. The telecom company acquires advertisements from one or more of a plurality of advertisers. The advertisements comprise advertisement tunes, text messages, audio messages, or video messages. The telecom company acquires permission from the subscriber for inserting advertisements in phone calls and messaging service messages of the subscriber. The advertisements may be inserted during one of initiation, active state, engaged state and termination of the phone call. Further, the advertisements are inserted at the beginning or the end of the messaging service messages of the subscriber. The revenue generated from advertising by the telecom company is shared with the subscriber through discounts on call charges or through payments of predetermined amount to the subscriber.

21 Claims, 6 Drawing Sheets

ADVERTISEMENT TUNES AND MESSAGES

CROSS REFERENCE TO RELATED APPLICATIONS

This application is a continuation application of non-provisional patent application Ser. No. 11/985,955, titled "Advertisement Tunes and Messages", filed Nov. 19, 2007 in the United States Patent and Trademark Office. The specification of this application is incorporated by reference herein in its entirety.

BACKGROUND

This invention, in general, relates to generation of revenue by a telecom company and more particularly to generation of revenue by a telecom company by placing advertisements in phone calls and messaging service messages of the customers of the telecom company.

The widespread use of mobile communication devices has enabled different methods of advertising through these mobile communication devices. The existing methods of advertising on a mobile phone may involve intrusive modes such as unsolicited calls or text messages from advertisers without the assent of the consumers. In addition to being intrusive, these modes of advertising may offer no monetary benefits to the consumer and hence may not be well received.

Advertising on mobile phones has a number of advantages such as farther reach, greater visibility, and ability to target a particular group of customers, etc., making mobile advertising one of the popular forms of advertising. The mobile advertising medium can be efficiently tapped by ensuring active participation of the consumers in receiving the advertisements. Hence, there is a need for ensuring active participation of the consumers by rewarding them for receiving the advertisements.

There is a need for a method and system to generate revenue for a telecom company by advertising on mobile phones of the consumers based on the consent of the consumers. Further, there is a need for rewarding the consumers for receiving the advertisements, thereby ensuring active participation of the consumers and effective advertising on the mobile phones.

SUMMARY OF THE INVENTION

The method and system disclosed herein addresses the above stated need of generating revenue by a telecom company by advertising on phone calls and messaging service messages of a subscriber. Further, the method disclosed herein enables sharing of the generated revenue with the subscriber. The telecom company acquires advertisements from one or more of a plurality of advertisers. The telecom company acquires permission from the subscriber for inserting the acquired advertisements in the phone calls and the messaging service messages of the subscriber. The telecom company generates revenue by inserting advertisements in the phone calls and messaging service messages based on the permission from the subscriber. The telecom company shares the generated revenue with the subscriber.

The telecom company acquires advertisements from one or more of a plurality of advertisers wishing to advertise through the telecom company. The advertisers may be one of business enterprises, corporations, industries, product and service companies, individual advertisers, etc. The advertisements include advertisement tunes, text messages, audio messages, video messages, and a combination thereof. The telecom company and the advertisers mutually agree upon the advertising charges. The advertising charges are determined by the telecom company based on the duration or length of the advertisements and point of insertion of the advertisements in the phone call and the messages. The telecom company, thus, generates revenue by inserting advertisements obtained from the advertisers in the phone calls and messages of the subscriber.

The subscriber permits the telecom company to advertise on phone calls and messages either initiated or received by the subscriber, by selecting from a plurality of advertising schemes offered by the telecom company. In the case of advertising on the phone calls of the subscriber, the advertisements may be inserted in one or more of the initiation, active state, engaged state, and the termination of the phone call. In one implementation of the method, an advertisement tune may be used to replace the ringback tone of the phone call. When a caller calls a subscriber, instead of hearing the ringback tone, the caller listens to an advertisement tune that is used to replace the ringback tone. In another embodiment of the method, the advertisement tunes may be played to the caller and the subscriber during active state of the call, when the caller and the subscriber are engaged in a conversation. In yet another embodiment of the method, the advertisement tune may be played to the caller and the subscriber immediately after the call has been terminated by either of the parties.

In the case of advertising on the messaging service message of the subscriber, the telecom company introduces advertisements at the beginning and/or at the end of the message. The messaging service message may be one of a text short messaging servicing (SMS) message, a voice SMS, a multimedia messaging service (MMS) message, an enhanced messaging service (EMS) message, an extended messaging service (XMS) message, etc.

The subscriber is remunerated for permitting the insertion of advertisements comprising advertisement tunes, text messages, audio messages, or video messages in one of the phone calls and the messaging service messages. The telecom company shares the revenue generated through advertising with the subscriber by offering discounts on call charges or by paying a predefined amount back to the subscriber. The revenue shared with the subscriber is determined based on the advertising scheme selected by the subscriber and the number calls or messages received or initiated by the subscriber.

DETAILED DESCRIPTION OF THE INVENTION

Figure 1:
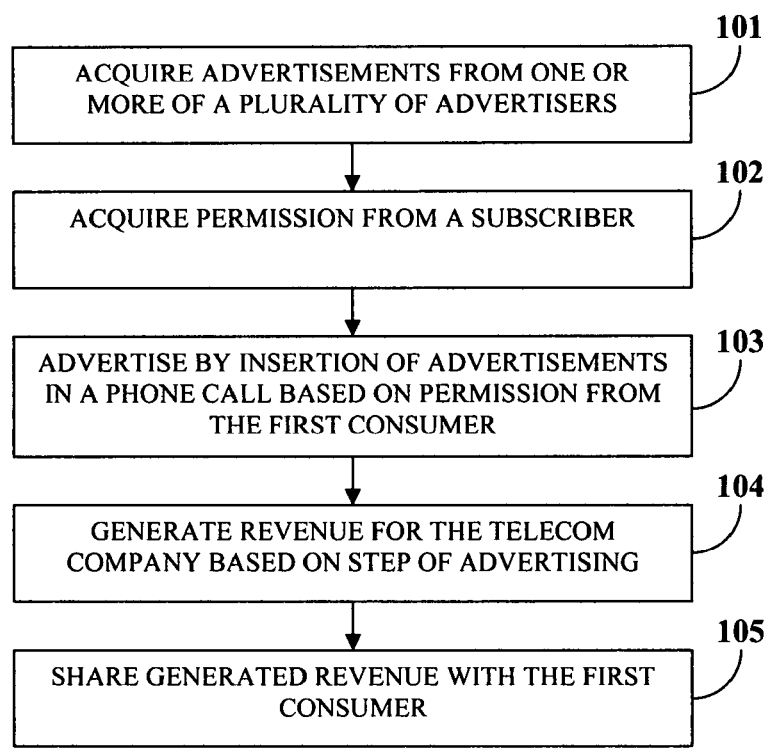
FIG. 1 illustrates a method of generating revenue by a telecom company and sharing the generated revenue with a subscriber.

FIG. 1 illustrates a method of generating revenue by a telecom company and sharing the generated revenue with a subscriber. The telecom company acquires 101 advertisements from one or more of a plurality of advertisers. The advertisers may be one of business enterprises, corporations, industries, product and service companies, individual advertisers, etc. The advertisements include advertisement tunes, text messages, audio messages, video messages, and a combination thereof. The telecom company acquires permission 102 from a subscriber for inserting advertisements 103 in the phone calls and messages of the subscriber. The subscriber is one of the consumers of the telecom company, wherein the consumer is referred to as subscriber, once the consumer subscribes to the advertising services of the telecom company. The subscriber selects from one of a plurality of advertising schemes offered by the telecom company. The advertising schemes are more thoroughly described hereunder in the detailed description of FIG. 1. The telecom company generates revenue 104 by inserting advertisements in the phone call based on permission from the subscriber. The phone call may be initiated or received by the subscriber. The telecom company shares 105 the generated revenue with the subscriber.

The advertisements may be inserted during one of an initiation, an active state, an engaged state, and termination of the phone call. In the case of a caller initiated call, a caller calls the subscriber. Advertisement from different advertisers may be inserted in one phone call during the initiation, active state, engaged state, or termination of the phone call. In an embodiment of the method disclosed herein, the ringback tone in the caller initiated call is replaced with an advertisement tune provided by the advertisers. The advertisement tune may include a mandatory message, a tag line, and a short advertisement. In the caller initiated call, the caller listens to the advertisement tune before the subscriber answers the call. In one implementation of the method disclosed herein, the caller needs to listen to advertisement tune until the playing of the mandatory message is completed before the caller engages in a conversation with the subscriber. The mandatory message is played to circumvent the possibility that the subscriber answers the phone call before the caller has a chance to listen to the advertisement tune. Exemplarily, the mandatory message may state that the call is sponsored by the advertiser. For example, the mandatory message may state, "This call to the subscriber is sponsored by company A, the number one cell phone company in the world."

In the case of a subscriber initiated call, the subscriber makes a call to a receiver. The advertising tune replacing the ringback tone in the subscriber initiated call is heard by the subscriber. After the receiver answers the call, the receiver gets to listen to the advertisement tune. In this implementation, both the subscriber and the receiver listen to the advertisement tune prior to the beginning of the conversation between them. Further, the method disclosed herein allows insertion of video advertisements in the subscriber initiated phone call such that the subscriber views the video advertisement until the call is answered by the receiver.

In one embodiment of the method disclosed herein, the caller initiated call and the subscriber initiated call may be interrupted after a predetermined time limit and the tag line and/or the short advertisement is played to the parties engaged in the phone call. The subscriber may select the periodicity of insertion of advertisements in the active state of a phone call. Further, upon termination of the phone call, advertisement tunes may be played to the subscriber and the caller or receiver.

In another embodiment, the telecom company may insert an advertisement to a messaging service (MS) message sent by the subscriber. An MS message may be one of a text short messaging service (SMS) message, a voice SMS message, a multimedia messaging service (MMS) message, an enhanced messaging service (EMS) message, and an extended messaging service (XMS) message. The advertisements may be inserted at the beginning or at the end of the message. These advertisements inserted in the MS messages exemplarily include a text advertisement, an audio advertisement, a video advertisement and other multimedia advertisements. Further, the revenue generated by the telecom company by inserting advertisements in the MS messages of the subscriber is shared with the subscriber.

The subscriber may subscribe to one or more of a plurality of advertising schemes offered by the telecom company. Through the advertising schemes, the subscriber permits the telecom company to insert advertisements in the phone calls or the MS messages of the subscriber. Further, the subscriber may decide the point of insertion of the advertisements in the phone calls and the messages. For example, the subscriber may want advertisements to be inserted only at the initiation and the termination of the phone calls. In order to seek more remuneration, the subscriber may want advertisements to be inserted at periodic intervals during the active state of the phone call. Furthermore, the advertising schemes also determine the amount of generated revenue to be shared with the subscriber.

Exemplarily, the advertising schemes comprise a random advertising scheme, a one set advertising scheme and a time specific advertising scheme. In the random advertising scheme, the telecom company randomly selects an advertisement acquired from one or more of a plurality of advertisers and inserts the selected advertisement in the phone calls or the MS messages opted by the subscriber. For example during the first phone call, the subscriber and/or the caller or receiver may listen to an advertisement of a mobile phone company. During the second call, they may listen to a soft drink promotional advertisement.

In the one set advertising scheme, the telecom company plays the advertisements of a single advertiser to a selected group of subscribers. The one set advertising scheme may be suitable for corporate subscribers that are employees of a corporate body or a company. For example, the telecom company inserts corporate advertisements of the corporate body in the phone calls and MS messages of the corporate subscribers. Thereby, the corporate body may advertise itself to the people calling any of the corporate subscribers. For instance, a credit card company may want to advertise the credit card company for brand imaging. Using the one set advertising scheme, the credit card company ensures that a caller making a call to the credit card company's corporate numbers or to the employees of the credit card company listens to the advertisement of the credit card company.

In the time specific advertising scheme, an advertiser agrees upon a time slot for advertising with the telecom company. The telecom company inserts advertisements of the advertiser in all the permitted phone calls handled by the telecom company during the agreed time slot. The time slot may be one of a daily, an hourly, minutely, monthly, or yearly time slots. For example, a mobile phone company may want to advertise a new mobile phone model on the day of launching of the phone model. The mobile phone in agreement with the telecom company uses the time specific advertising scheme to advertise the mobile phone model. On the day of launch, the telecom company inserts advertisements of the mobile phone model in all the permitted phone calls handled by the telecom company on that day.

The telecom company generates revenue by permitting advertisers to insert advertisements in the phone calls and MS messages of the subscribers. The advertisers agree upon the advertising charges with the telecom company at a predetermined or a variable rate and pay the advertising charges to the telecom company as per the agreed rate. The advertising charges may depend on a number of factors including whether the advertisements are inserted in the phone calls or in the MS messages, the length or duration of the advertisements, the point of insertion of the advertisements in the phone calls and the MS messages, etc. For example, the advertising charges for advertisements inserted during the initiation of a phone call or at the beginning of an MS message, may be more than the charges for advertisements inserted at call termination.

The generated revenue by the telecom company is shared with the subscriber by offering discounts on call charges to the subscriber or by remunerating the subscriber for allowing advertisements. The discounts offered on call charges may be at a predetermined rate or may vary according to the advertising scheme selected by the subscriber. The subscriber may be remunerated through a payment amount or compensated through deductions in the phone bill. Further, the telecom company may remunerate the subscriber by offering certain telecom services to the subscriber free of cost. For example, if the subscriber permits the insertion of advertisements in the text SMS messages, the telecom company may allow the subscriber to send a hundred text SMS messages free of cost. Further, a subscriber permitting the insertion of advertisements in between an active call may obtain more waivers on call charges than a subscriber permitting insertion of advertisements at the beginning or the ending of the phone call. In one implementation of the method, the generated revenue is shared with the subscriber only when the call is received. Furthermore, the sharing of the generated revenue is determined by the number of calls received or made by the subscriber.

Figure 2:
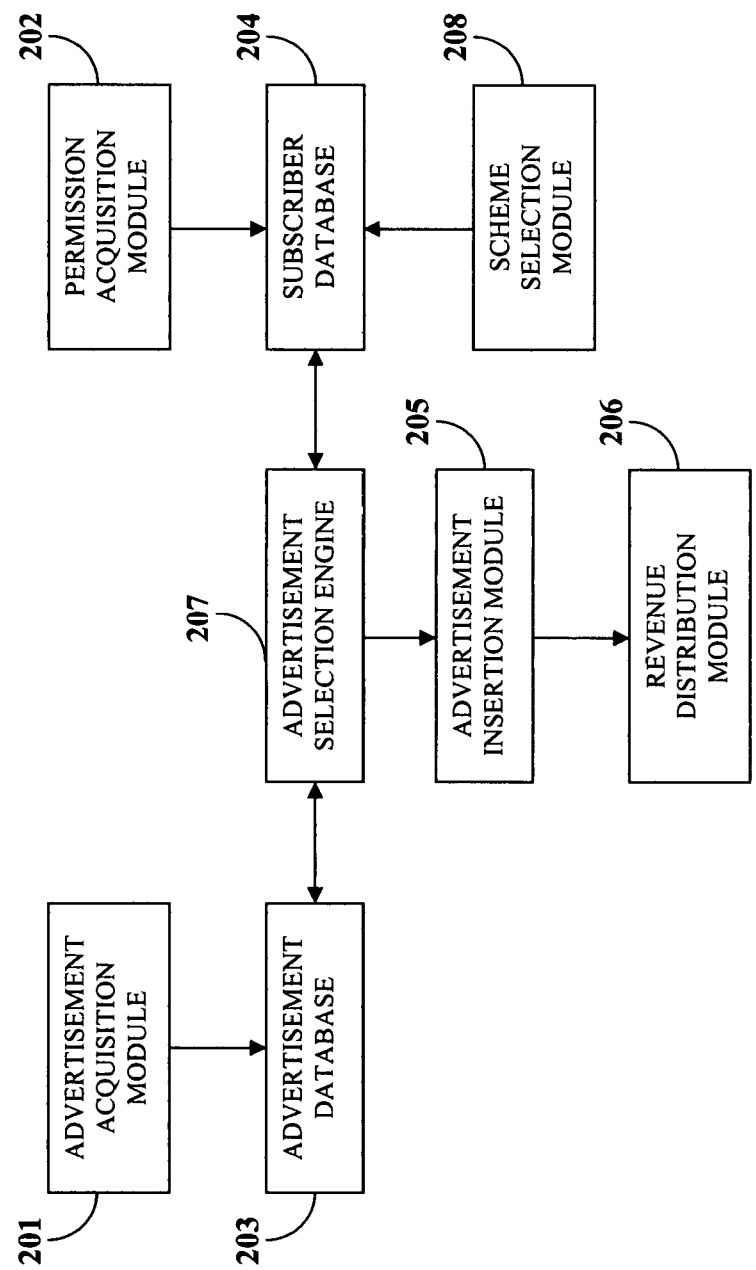
FIG. 2 illustrates a system for generating revenue by a telecom company and sharing the generated revenue with a subscriber.

FIG. 2 illustrates a system for generating revenue by a telecom company and sharing the generated revenue with a subscriber. The system comprises an advertisement acquisition module 201, a permission acquisition module 202, an advertisement database 203, a subscriber database 204, an advertisement insertion module 205, a revenue distributing module 206, an advertisement selection engine 207, and a scheme selection module. The advertisement acquisition module 201 acquires advertisements from a plurality of advertisers and stores the acquired advertisements in the advertisement database 203. The advertisements are organized in the advertisement database 203 based on the personal preferences of subscribers, the type of advertisements, the point of insertion of the advertisement during the phone call, and the advertising scheme selected by the subscribers.

The permission acquisition module 202 is used for acquiring permission from the subscriber by the telecom company for advertising during communication between the subscriber and the caller either over a phone call or an MS message. The subscriber database 204 is used to store the profile of the subscribers. The subscriber profile comprises personal information of the subscriber such as age, locality of residence, profession, hobbies, interests, etc. The subscriber profiles also store the preferred type of advertisements, the stage of the phone call when the advertisements are to be inserted, the advertising schemes selected by the subscriber, etc. The subscriber profile may be used by advertisers to insert advertisements relevant to the subscriber and to advertise to a select target group of subscribers. For example, a subscriber may be a college student with an interest in electronic hobby kits. The telecom company may insert advertisements of electronic hobby shops in the phone calls and MS messages of the college student. The electronic hobby shops are more likely to reach out to other electronic hobbyists who are callers or receivers of calls from the college student.

The scheme selection module 208 enables the subscriber to select from one or more of a plurality of advertising schemes. The advertising schemes may be one of a random advertising scheme, a one set advertising scheme, and a time specific advertising scheme. The advertising schemes are described in detail in the detailed description of FIG. 1.

The advertisement selection engine 207 analyses the subscriber profiles stored in the subscriber database 204 and based on the preferences of the subscriber and the advertising scheme selected by the subscriber, selects advertisements to be inserted in the phone call of the subscriber. Exemplarily, the advertisement selection engine 207 selects advertisements by comparing the subscriber profile with the organized advertisements in the advertisement database 203 until a match is found. Further, the advertisement selection engine 207 also determines the type of advertisement to be inserted. For example, the advertisement selection engine 207 selects an advertisement tune for insertion in a phone call. For the insertion of advertisements to a text SMS message and an MMS message, the advertisement selection engine 207, exemplarily selects a text advertisement and a video advertisement respectively. The selected advertisement is conveyed to the advertisement insertion module 205. Further the advertisement selection engine 207 may select advertisements of different advertisers to be inserted on the same phone call or MS messages. The advertisement insertion module 205 inserts the selected advertisement in the phone call or the MS message as opted by the subscriber. The advertisement insertion module 205 determines the point of insertion of the advertisement in the phone call or the MS message. The advertisement insertion module 205 may insert the selected advertisement during one of an initiation, an active state, an engaged state, and a termination of the phone call. Further, advertisement insertion module 205 may insert the advertisements in the beginning or the end of an MS message. The revenue distribution module 206 calculates the revenue generated by the telecom company through the advertisements. The revenue distribution module 206 also calculates the portion of revenue to be shared with the subscriber. The revenue distribution module 206 determines discounts and waivers on call charges, free telecom services to be provided to the subscriber, payment amounts, etc. admissible to the subscriber for permitting the insertion of advertisements.

Figure 3:
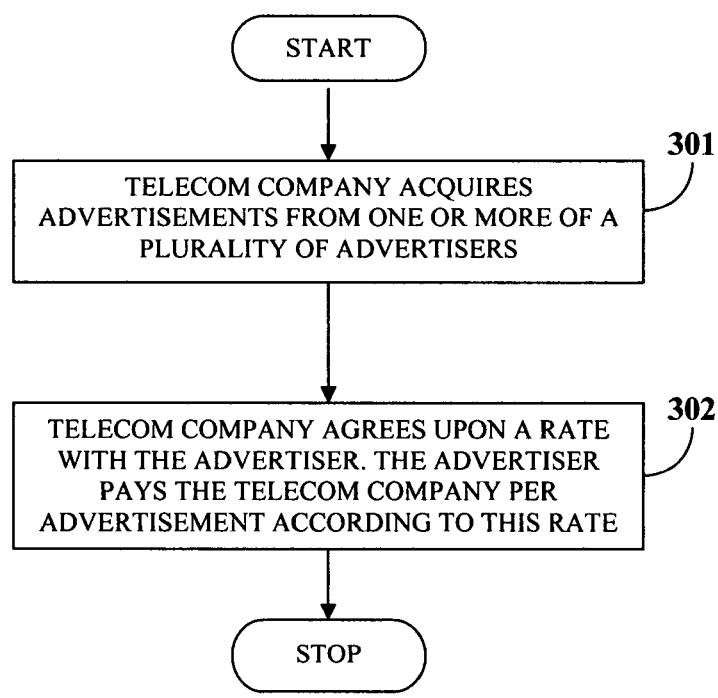
FIG. 3 illustrates an exemplary flowchart of a process of acquiring advertisements from one or more of a plurality of advertisers.

FIG. 3 illustrates an exemplary flowchart of a process of acquiring advertisements from a plurality of advertisers. The telecom company acquires advertisements 301 from a plurality of advertisers through the advertisement acquisition module 201 and stores the advertisements in the advertisement database 203. The advertisements may be one of an advertisement tune, a text advertisement, an audio advertisement, and a video advertisement, or a combination thereof. The telecom company and the advertiser agree upon the advertising charges at a predetermined or a variable rate 302. The advertisers pay the telecom company for insertion of their advertisements as per the agreed rate of advertising charges. The steps of acquiring advertisements and determining the advertising charges are described more thoroughly in the detailed description of FIG. 1.

Figure 4:
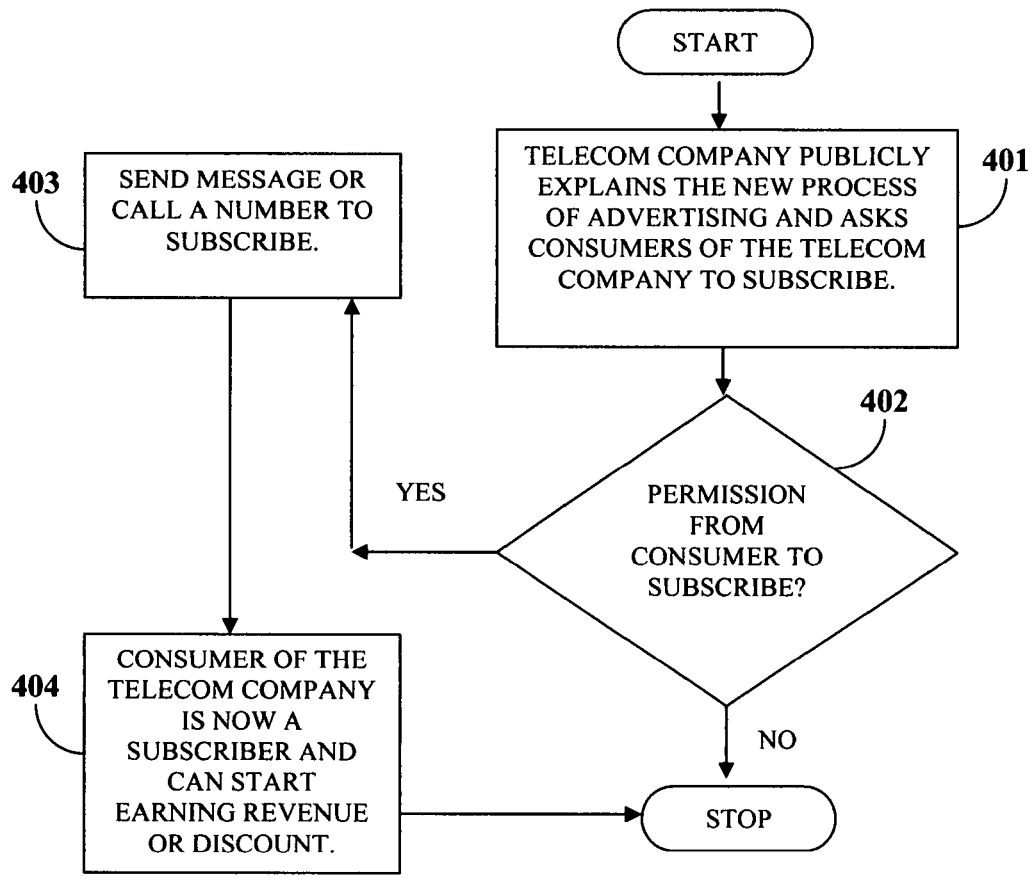
FIG. 4 illustrates an exemplary flowchart of a process of acquiring permission for advertising from a consumer.

FIG. 4 illustrates an exemplary flowchart of a process of acquiring permission for advertising from a consumer. The telecom company publicly 401 announces and explains the new process of advertising and the benefits for the consumers by subscribing to the advertising schemes. The consumers may opt for one of the advertising schemes for inserting advertisements in the phone call or MS messages of the consumers. The telecom company seeks confirmation of permission 402 from the consumer for advertising on the consumers' phone calls and MS messages. Exemplarily, the telecom company may request the consumer to send an SMS message 403 or call a number to subscribe to the advertising scheme. Once the consumer has subscribed, advertisements are inserted in the phone calls and MS messages of the consumer. The consumer after subscribing to the advertising scheme is now a subscriber 404 and begins to earn revenue or obtain discounts from the telecom company.

Figure 5:
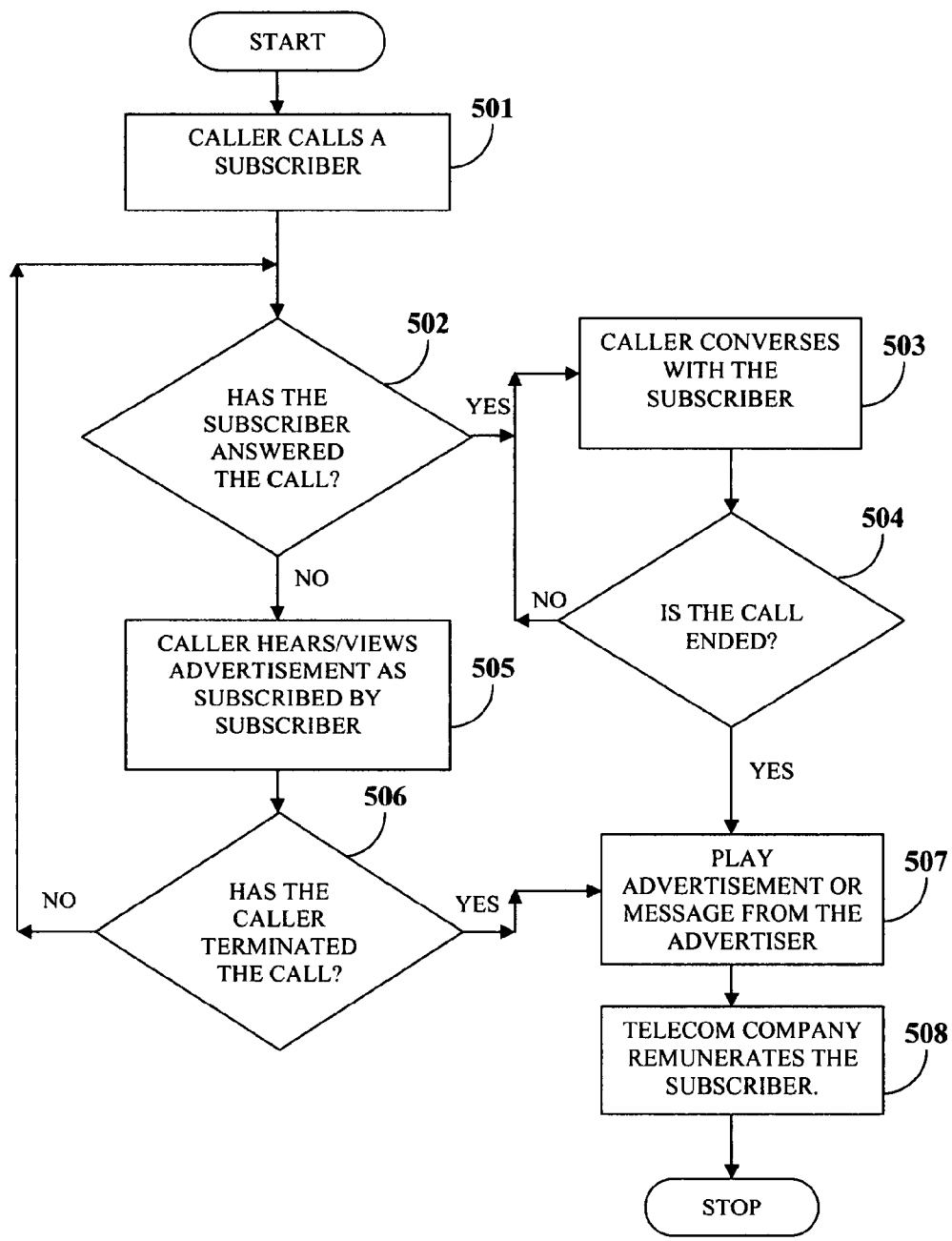
FIG. 5 illustrates an exemplary flowchart of advertising on a phone call initiated by a caller to a subscriber.

FIG. 5 illustrates an exemplary flowchart of advertising on a phone call initiated by a caller to a subscriber. When a caller calls a subscriber 501, exemplarily, the caller listens to the advertisement tune that is used to replace the ringback tone of the phone call. The caller continues to listen to the advertisement tune until the subscriber answers the phone call 502 or the caller terminates the phone call 506 before the call is answered by the subscriber. The advertisement subscribed by the subscriber may be one of an advertising tune, a text advertisement, an audio advertisement, and a video advertisement. The caller and the subscriber start 503 a conversation after the subscriber answers the phone call. After the termination of the call by the caller or the subscriber 504 an advertisement is played or a message is sent 507 from the advertisers to the caller and/or the subscriber. The telecom company then remunerates 508 the subscriber for permitting the insertion of advertisements during the phone call.

Figure 6:
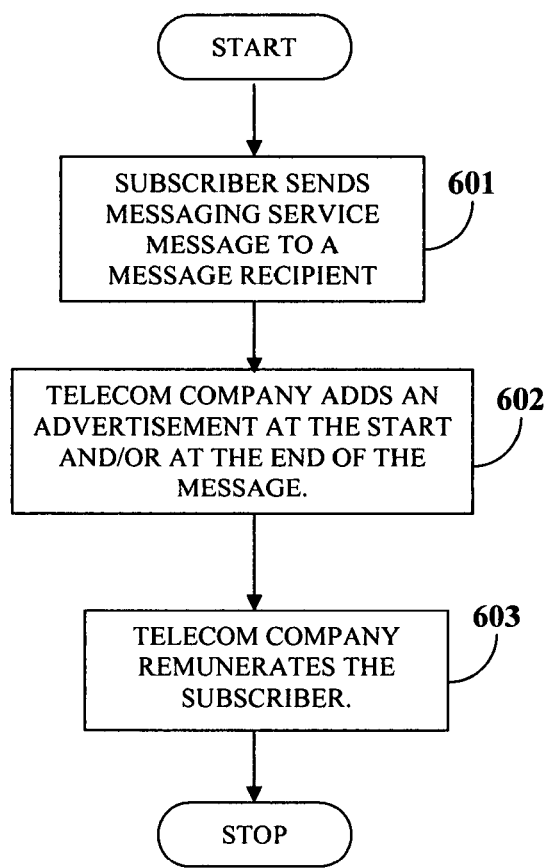
FIG. 6 illustrates an exemplary flowchart of a process of inserting advertisements in messaging service messages.

FIG. 6 illustrates an exemplary flowchart of a process of inserting advertisements in MS messages. The subscriber sends an MS message to a message recipient 601. The MS message may be one of a text SMS message, a voice SMS message, an MMS message, an EMS message, and an XMS message. The telecom company adds 602 an advertisement at the start and/or end of the MS message. The type of advertisement added depends on the type of MS message being sent by the subscriber. For example, a text advertisement is inserted in a text SMS message and a video advertisement is inserted in an MMS message. The telecom company remunerates 603 the subscriber for permitting the insertion of advertisements in the MS messages.

It will be readily apparent to those skilled in the art that the various methods and algorithms described herein may be implemented in a computer readable medium, e.g., appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product, comprising computer executable instructions embodied in a computer-readable medium, comprises computer parsable codes for the implementation of the processes of various embodiments.

Where databases are described, such as the advertisement database 203 or the subscriber database 204, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, Sun® processors, IBM® processors etc., that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of generating revenue by a communications service provider and sharing said generated revenue with a subscriber, comprising the steps of:
  acquiring one or more advertisements from one or more advertisement databases associated with one or more advertisers by a computer system associated with the communications service provider;
  advertising during a communication sequence between the subscriber and a user by said communications service provider, wherein said user is one of a subscriber and a non-subscriber of said communications service provider, wherein said step of advertising comprises:
    inserting said one or more advertisements in said communication sequence between the subscriber and said user, comprising one or more of:
      replacing a ringback tone of said communication sequence between the subscriber and said user by said computer system; and
      interrupting said communication sequence and presenting one or more of said selected advertisements by said computer system;
  generating said revenue by collecting advertising charges from said advertisers by the communications service provider; and
  sharing said generated revenue with the subscriber by the communications service provider.

2. The method of claim 1, wherein the advertisements comprise one of advertisement tunes, text advertisements, audio advertisements, and video advertisements.

3. The method of claim 2, wherein said advertising tune comprises one or more of a mandatory message, a tag line, and a short advertisement.

4. The method of claim 1, wherein said phone call is one of a subscriber initiated phone call and said at least said user initiated phone call.

5. The method of claim 4, wherein the advertising tune inserted in said user initiated phone call is played prior to receiving said user initiated call by the subscriber.

6. The method of claim 5, wherein said user needs to listen to the mandatory message of the advertising tune prior to conversing with the subscriber over the user initiated call.

7. The method of claim 4, wherein the advertising tune inserted in said subscriber initiated phone call is played to the subscriber and said user receiving the subscriber initiated phone call for a predefined period of time.

8. The method of claim 7, wherein the subscriber and said at least another subscriber need to listen to the mandatory message of the advertising tune prior to conversation on the subscriber initiated call between subscriber and said at least another subscriber.

9. The method of claim 1, wherein the advertisements are inserted during one or more of an initiation, an active state, an engaged state, and termination of said communication sequence between the subscriber and said user.

10. The method of claim 9, wherein the advertisements during said active state and engaged state of said communication sequence between the subscriber and said user are inserted in one of a predefined periodic or an aperiodic time interval.

11. The method of claim 9, wherein the advertisements inserted during each of said initiation, said active state, said engaged state, and said termination of said communication between the subscriber and said user are from one or more of the advertisers.

12. The method of claim 1, wherein said advertising charges are determined by the communications service provider based on one or more of:
  duration of the advertisements and point of insertion of the advertisements in the said communication between the subscriber and said user, and
  time of insertion of said advertisements.

13. The method of claim 1, further comprising a step of inserting the advertisements to one of a text short messaging service message, a voice short messaging service message, a multimedia messaging service message, an enhanced messaging service message, and an extended messaging service message of the subscriber, wherein revenue generated by advertising using said messaging service messages is shared with the subscriber.

14. The method of claim 1, wherein the step of advertising comprises offering the subscriber an option of selecting one of a plurality of advertising schemes.

15. The method of claim 1, further comprising receiving permission from said subscriber by the computer system associated with the communications service provider for advertising during said communication sequence between the subscriber and said user.

16. The method of claim 1, wherein said user directly connects to one of an advertisement database and said communications service provider to listen to said advertisement.

17. A computer system, said computer system comprising:
  one or more processors;
  an advertisement acquisition module configured for acquiring one or more advertisements from one or more advertisement databases associated with one or more advertisers;
  an advertisement selection engine configured for selecting said acquired advertisements based on one of an advertising scheme and a profile of a subscriber to a communications service provider;
  an advertisement insertion module configured for advertising during a communication sequence between the subscriber and a user, said user being one of a subscriber and a non-subscriber of said communications service provider;
  said advertisement insertion module configured for inserting said selected advertisements during a communication sequence between said subscriber and a user;
  said advertisement insertion module configured for replacing a ringback tone of said communication sequence between the subscriber and said user;
  said advertisement insertion module configured for interrupting said communication sequence and presenting one or more of said selected advertisements;
  a revenue distribution module for determining one of discounts on call charges and payments admissible to the subscriber.

18. The computer system of claim 17, further comprising a database for storing the acquired advertisements and a subscriber database for storing said profile of the subscriber.

19. The system of claim 18, wherein said subscriber profile comprises personal preferences of the subscriber, preferred type of advertisements, point of insertion of the advertisements during said communication between said subscriber with said user, and the advertising scheme selected by the subscriber.

20. The system of claim 17, further comprising a permission acquisition module for acquiring said permission from the subscriber for advertising during said communication between said subscriber and said user via said communications service provider.

21. A computer program product comprising computer executable instructions embodied in a non-transitory computer-readable medium, wherein said computer program product comprises:

a first computer parsable program code for acquiring one or more advertisements from one or more advertisement databases associated with one or more advertisers;

a second computer parsable program code for advertising during a communication sequence between the subscriber and a user by said communications service provider, wherein said user is one of a subscriber and a non-subscriber of said communications service provider;

a third computer parsable program code for inserting said one or more advertisements in said communication sequence between the subscriber and said user, comprising one or more of:
  replacing a ringback tone of said communication sequence between the subscriber and said user; and
  interrupting said communication sequence and presenting one or more of said selected advertisements;

a fourth computer parsable program code for generating said revenue by collecting advertising charges from said advertisers; and a fifth computer parsable program code for sharing said generated revenue with the subscriber.

* * * * *